April 27, 1943.  O. H. FOWLER  2,317,601
FLUID PRESSURE BRAKING SYSTEM
Filed March 7, 1940  2 Sheets-Sheet 2

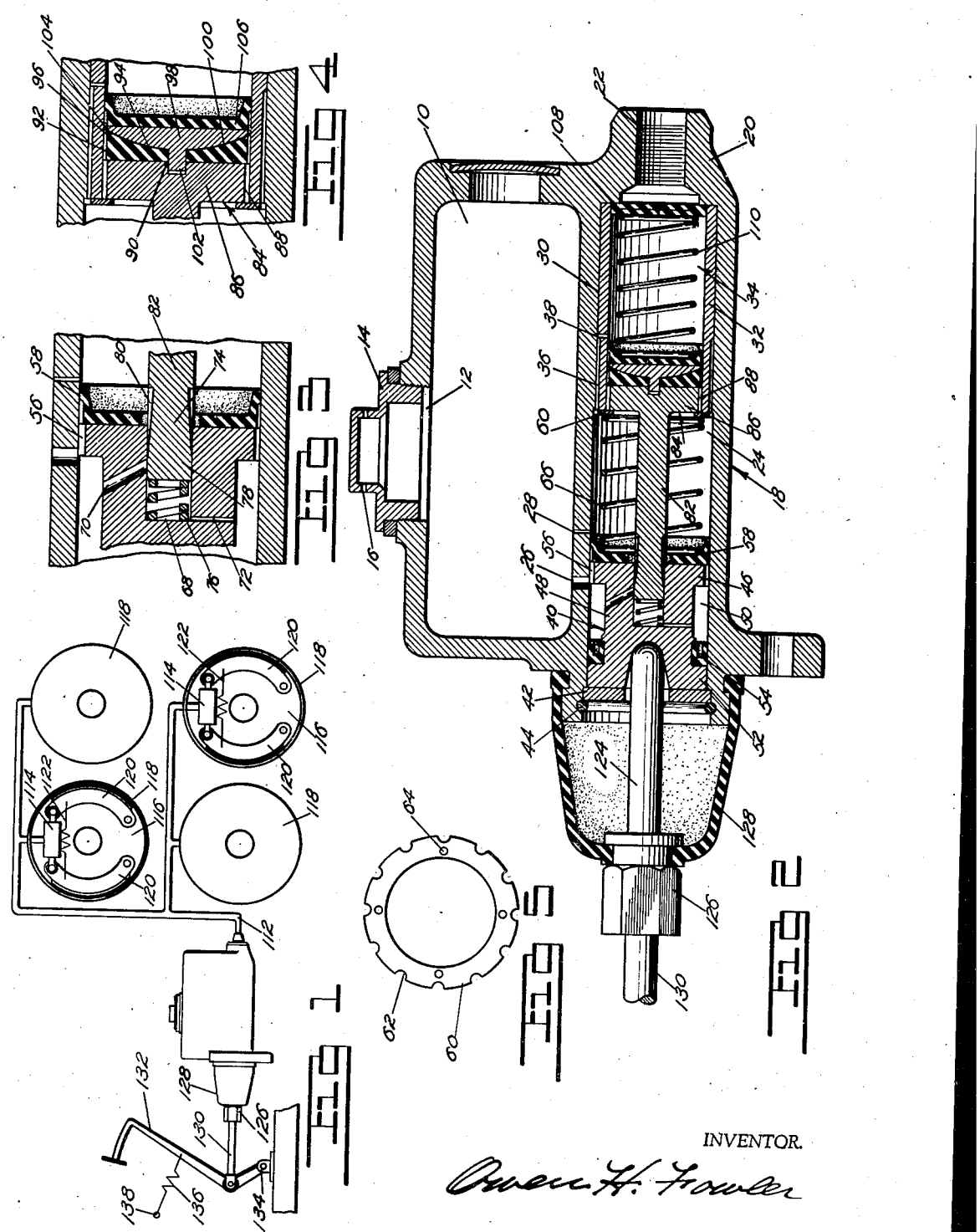

INVENTOR.
Owen H. Fowler

Patented Apr. 27, 1943

2,317,601

UNITED STATES PATENT OFFICE 2,317,601

FLUID PRESSURE BRAKING SYSTEM

Owen H. Fowler, Detroit, Mich., assignor to Hydraulic Brake Company, Detroit, Mich., a corporation of California Application March 7, 1940, Serial No. 322,790

13 Claims. (Cl. 60—54.6)

This invention relates to fluid pressure braking systems.

Broadly the invention comprehends a fluid pressure braking system including a fluid pressure producing device of the two-phase type operative to increase pressure on fluid without proportionately increasing the applied force.

An object of the invention is to provide a fluid pressure producing device of the two-phase type operative to spread the transition from a low to a relatively high pressure over a prolonged period so as to smooth out the operation of the device.

Another object of the invention is to provide a fluid pressure producing device of the two-phase type including means controlled by pressure on the fluid in the device for effecting a gradual transition from low to high pressure.

Another object of the invention is to provide a fluid pressure device of the two-phase type including a low pressure producing means, a high pressure producing means, and means for effecting transition from low to high pressure actuated by a reaction force increasing pressure on the fluid in the high pressure producing means.

The invention is embodied in a double diametral cylinder of a particular design and assembly and a high pressure resistant piston, disposed therein. However, these features provide the basis of divisional applications Serial Nos. 374,004 and 374,005 and are not herein specifically claimed.

Other objects and advantages of the invention will appear from the following description taken in connection with the accompanying drawings forming a part of this specification, and in which—

Fig. 1 is a schematic view of a fluid pressure braking system embodying the invention;

Fig. 2 is a vertical sectional view of the fluid pressure producing device;

Fig. 3 is an enlarged sectional view illustrating the valve structure;

Fig. 4 is a sectional view illustrating the high pressure piston;

Fig. 5 is a plan view of a washer providing a stop for the high pressure piston;

Figure 6:
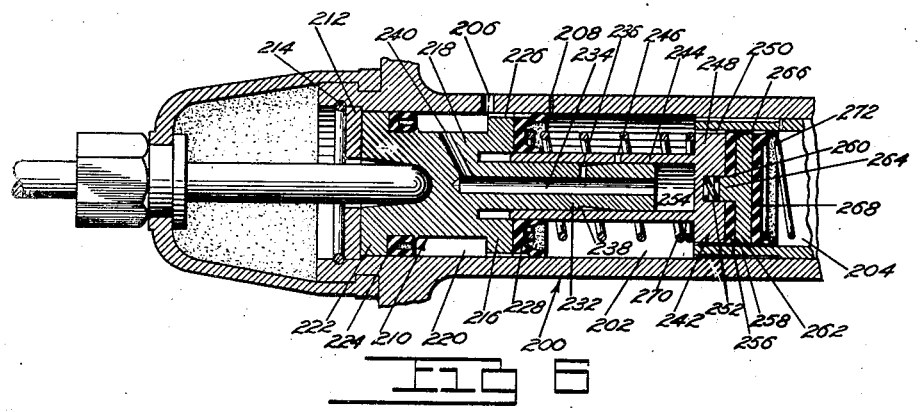
Fig. 6 is a sectional view of a cylinder partly broken away, and pistons movable therein embodying a modification of the invention.

Referring to the drawings for more specific details of the invention, a single casting includes a reservoir 10 having a filling opening 12 normally closed as by a head 14 having openings 16 therethrough for venting the reservoir to the atmosphere, and a cylinder 18 at the base of the reservoir having one of its ends closed as by a head 20 provided with a discharge port 22, and its other end open. In the open end of the cylinder is a chamber 24 of standard gauge, bearingized, and provided with spaced ports 26 and 28 affording communications between the chamber 24, and the reservoir 10. The cylinder 18 also has a bore 30, preferably of slightly less diameter than the chamber 24 arranged forward of, concentric to, and in direct communication with the chamber 24 and also with the discharge port 22.

A cylinder section 32 fitted tightly and sealed in the bore 30 has a bearingized chamber 34 and a circumferentially reduced portion providing in conjunction with the wall defining the bore 30 an annular passage 36 communicating with the chamber 24, and a port 38 arranged in the wall of the cylinder 32 provides a communication between the chamber 34 and the annular passage 36.

Figure 7:
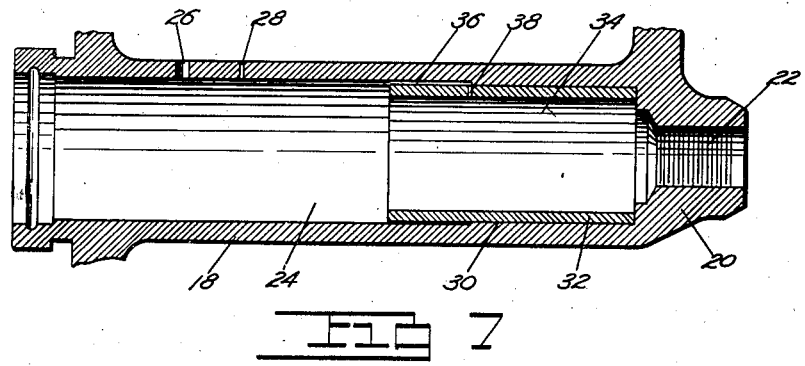
Fig. 7 is an enlarged sectional view illustrating the compound cylinder.
Figure 8:
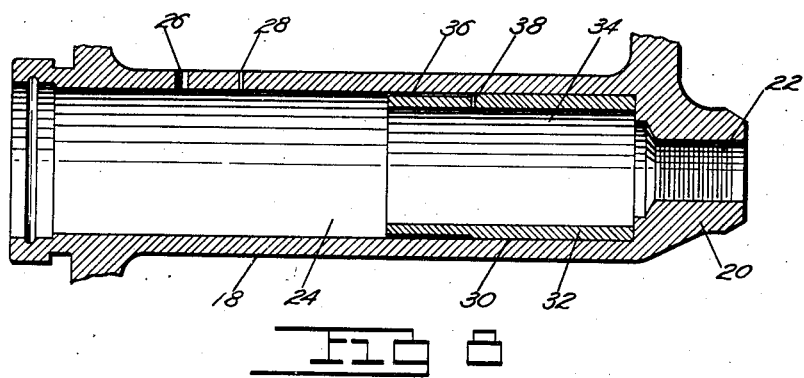
Fig. 8 is a sectional view illustrating a modification of the compound cylinder.

In order to standardize production and thereby reduce cost in the manufacture of fluid pressure producing devices of this type, it is a purpose of the instant invention to construct the reservoir 10 and the cylinder 18 as a single unit. The cylinder has a standard gauge chamber 24 and a bore 30 of uniform size forward of the chamber. The bore 30 may be of less diameter than the chamber 24, as shown in Figs. 2, 4, and 7, or of the same gauge, as illustrated in Fig. 8. It is also proposed to construct the cylinder section 32 as a separate unit having a uniform circumference and overall length complementary to the bore 30, and a chamber 34 which may be any one of several gauges so that any desired differential in the gauge of the chamber 24 and that of the chamber 34 may be had. This cylinder section 32 may be secured in the bore 30 by a press-fit, as illustrated in Figs. 2, 4, and 7, or the cylinder 18 may be heated and the cylinder section 32 chilled and then assembled as shown in Fig. 8.

A piston 40 reciprocable in the chamber 24 is retained against displacement by a washer 42 seated on the annular shoulder in the open end of the cylinder 18 and held in place by a retaining ring 44 seated in a groove in the wall of the cylinder. The piston 40 includes a head 46, a body 48 having a reduced diameter providing in conjunction with the wall of the cylinder 18 an annular chamber 50 communicating with the reservoir 10 as by way of the port 26, and a skirt 52 supporting a sealing cup 54 for inhibiting seepage of fluid from the annular chamber 50 past the piston. The head 46 has a plurality of spaced passages 56 therethrough providing communications between the annular chamber 50 and that portion of the chamber 24 forward of the piston, and a sealing cup 58 seated on the head 46 of the piston controls the passages 56.

A washer 60 seated on the end of the cylinder 32 opposite the piston 40 has in its periphery a plurality of spaced notches 62 for the passage of fluid between the chamber 24 and the annular chamber 36, and also a plurality of spaced lands 64 preferably stamped or embossed in the body of the washer, and a spring 66 interposed between the sealing cup 58 and the washer 60 serves to retain the cup and washer against displacement and also to assist in return of the piston 40 to its retracted position.

The piston 40 has disposed concentrically in its body 48 a valve chamber 68 opening through the head of the piston. This valve chamber has a port 70 providing a communication between the valve chamber and the annular chamber 50 and also a vent 72 opening from adjacent the bottom of the valve chamber into the annular chamber 50 for inhibiting fluid lock. A valve 74 slidable in the valve chamber abuts a compression spring 76 of high elasticity seated on the bottom of the valve chamber.

The valve includes a cylindrical body 78 fitted snugly for reciprocation in the valve chamber. This cylindrical body has a peripheral groove or slot 80 adapted to register with the port 70 in the valve chamber so as to provide for passage of fluid from the chamber 24 through the valve and into the annular chamber 50. The groove or slot 80 is preferably tapered or calibrated so that fluid may be metered gradually from the chamber 24 through the valve into the annular passage 50.

The valve 74 has a stem 82 formed integral with a piston 84 reciprocable in the chamber 34. The piston normally seats on the lands 64 of the washer 60. It is essential that this piston be of such structure as to withstand high pressures without seepage of fluid past the piston and also without injury to the component parts of the piston.

As shown, the piston 84 includes a head 86 having a plurality of passages 88 therethrough providing communications between the chambers 24 and 34, and a concentrically disposed shallow bore 90. A rubber washer 92 seated on the head 86 of the piston has a concentric opening therethrough registering with the shallow bore 90. This washer is preferably constructed from rubber having a high durometer reading. The diameter of the washer is slightly less than the gauge of the chamber 34, so that fluid may by-pass the washer when it is not under pressure. The washer 92 has a concaved face 94, and this concaved face in conjunction with the perimeter of the washer provides a pronounced lip 96. A spacer or pressure block 98 seated on the concaved face of the washer has a convex face 100 complementary to the concaved face of the washer. The pressure block 98 has an extension 102 concentrically disposed on its convexed face, and this extension is received by the opening in the washer and also by the bore 90 in the head of the piston with small clearance between the bottom of the bore and the free end of the extension 102, so as to limit the compressibility of the washer and thus avoid binding of the washer in the chamber 34.

The pressure block 98 has a plurality of spaced passages 104 therethrough controlled as by a sealing cup 106 seated on the pressure block. High pressure imposed on the sealing cup 106 is transmitted through the pressure block 98 to the washer 60. This results in radial expansion of the washer, and because of the particular contour thereof the lip 96, when the washer is deformed under pressure, engages the wall of the chamber 34 with substantial bearing surface.

A two-way valve 108 seated on the head of the cylinder 18 within the chamber 34 controls the discharge port 22, and a spring 110 interposed between the sealing cup 106 and the two-way valve 108 serves to retain the cup and valve against displacement and also to return the pistons 40 and 84 to their retracted positions. The spring 110 is of high elasticity, and is preferably balanced with the spring 76 in the valve chamber.

A fluid pressure delivery pipe or conduit 112 has branches connected respectively to fluid pressure actuated motors 114, preferably arranged in pairs, one pair for actuating the brakes associated with the front wheels of a vehicle, and another pair associated with the rear wheels of the vehicle.

The brakes may be of any preferred type. As shown, each of the brakes includes a fixed support or backing plate 116, a rotatable drum 118 associated therewith, a pair of friction elements or shoes 120 pivoted on the backing plate for cooperation with the drum, a retractile spring 122 connecting the shoes, and a motor corresponding to the fluid pressure motors 114 mounted on the backing plate 116 between the shoes and connected thereto for activating the shoes into engagement with the drum against the resistance of the retractile spring.

A thrust pin 124 has one of its ends seated in a socket in the back of the piston 40, and on the other end of the thrust pin is a coupling 126 connected by a flexible boot 128 to the open end of the cylinder 18 for the exclusion of dust and other foreign substances. A rod 130 has one of its ends connected to the coupling 126 and its other end pivotally connected to a foot pedal lever 132 rockable on a stub shaft 134 and connected by a retractile spring 136 to a fixed support 138.

In a normal operation of this fluid pressure braking system, upon depressing the foot pedal lever 132 force is transmitted therefrom through the rod 130 and thrust pin 124 to the piston 40, resulting in movement of the piston 40 on its compression stroke, and also advancing the piston 84.

During the initial movement of the pistons 40 and 84 on the compression stroke, the sealing cup 58 on the piston 40 closes the port 28, and the sealing cup 106 on the piston 84 closes the port 38, and, thereafter, as the pistons advance, fluid in the chamber 24 is displaced therefrom through the passages 88 in the piston 84, past the washer 92, through passages 104 in the pressure block 98, and past the sealing cup 106, into the chamber 34, thence past the valve 108, through the discharge port 22 and fluid pressure delivery pipes 112, into the fluid pressure actuated motors 114, causing energization of the motors, with the resultant actuation of the friction elements 120 into engagement with the drums 118 against the resistance of the retractile springs 122 to effectively retard rotation of the drums.

During this operation, a large volume of fluid is displaced from the chamber 24 at a comparatively low pressure to accomplish a quick movement of the friction elements into engagement with the drums, and, thereafter, as the pistons advance, the reaction force on the fluid in the system forward of the pistons increases the pressure on the fluid in the chambers 24 and 34 until a predetermined equalized pressure on the fluid in the chambers is attained.

From this period of operation, further advance of the pistons opposed by the reaction forces produces a differential of pressure in the chambers 24 and 34, imposing a slightly greater pressure on the piston 84, tending to hold the piston 84 against movement; and, thereafter, relative movement of the pistons 40 and 84 gradually compresses the spring 76, resulting in cracking the valve and metering of fluid by the valve from the chamber 24, through the calibrated passage 80 and the port 70 into the annular chamber 50, thence through the port 26 into the reservoir. The passage 80 is so calibrated that the relief of fluid in the chamber 24 is effected gradually so as to smooth out the operation.

In instances where the foot pedal lever 132 is actuated impulsively, resulting in an extremely rapid advance of the piston 40, pressure created on the fluid in the chamber 24 causes a rapid forward surge of fluid in the chamber 24 against the back of the piston 84, tending to advance the piston 84. This advance movement of the piston 84 is yieldingly resisted by the column of fluid in the system forward of the piston 84 under the load of the friction elements of the respective brake structures.

The spring 110 also yieldingly resists this movement of the piston 84. This spring is of high elasticity, hence the combined reaction forces inhibit material movement of the piston 84, and this results in flow of fluid from the chamber 84 through the passages 88 in the piston 84, past the washer 92, through the passages 104 in the pressure block 98, and past the sealing cup 106 into the chamber 34, until the pressures on the fluid in the chambers 24 and 34 are equalized at a predetermined pressure adequate to move the friction elements into engagement with the drums, and thereafter, as the pressure on the fluid increases, the reaction forces on the piston 84 open the valve 74 against the resistance of the spring 76, as in a normal operation.

Upon conclusion of a braking operation, the foot pedal lever 132 is released, and returns to its retracted position under the influence of the retractile spring 136. This results in retraction of the rod 130 and thrust pin 124, and release of the piston 40 and return of the pistons 40 and 84 under the influence of the springs 66 and 110. During this operation, the spring 76 moves the valve 74 to its closed position.

As the pistons 40 and 84 return to their retracted positions, a partial vacuum is created in the chamber 34, and this results in drawing fluid from the reservoir 10 through the supply port 26, into the annular passage 50, thence through the passages 56 in the head of the piston 40, past the sealing cup 58 thereon, into the chamber 24, thence through the passages 88 in the piston 84, past the washer 92, through the passages 104 in the pressure block 98, and past the sealing cup 106 thereon into the chamber 34, completely filling the chambers 24 and 34.

During this operation, fluid is returning to the chamber 34 from the fluid pressure actuated motors 114, and the fluid pressure delivery pipes connecting the motors to the cylinder 18 under the influence of the retractile springs 122 connecting the friction elements of the respective brake structures. This may result in the chamber 34 receiving a quantity of fluid in excess of its capacity, and in this condition, the excessive quantity of fluid received by the chamber 34 is displaced therefrom through the port 38 and passage 36 into the chamber 24, thence through the port 28 into the reservoir.

A modification of the invention is illustrated in Fig. 6. In this modification a cylinder 200 has a large chamber 202 and a relatively small chamber 204 forward of, concentric to, and in direct communication with the large chamber. The large chamber has spaced ports 206 and 208 providing communications between the large chamber and a reservoir corresponding to the reservoir illustrated in the preferred embodiment of the invention.

A piston 210 reciprocable in the large chamber is retained against displacement by a washer 212 seated on an annular shoulder in the open end of the cylinder and held in place by a retaining ring 214 seated in a groove in the wall of the cylinder. The piston 210 includes a head 216, a body portion 218 having a reduced diameter providing, in conjunction with the wall of the cylinder 200, an annular chamber 220 communicating with the reservoir as by way of the port 206, and a skirt 222 supporting a sealing cup 224 for inhibiting seepage of fluid from the annular chamber 220 past the piston 210.

The head 216 of the piston has a plurality of spaced passages 226 therethrough providing communications between the annular chamber 220 and that portion of the cylinder forward of the piston, and a sealing cup 228 seated on the head 216 controls the passages 226. The head 216 of the piston 210 has a concentric extension 232 bored to provide a passage 234 communicating with the large chamber 202 by way of a port 236 opening into a beveled channel 238 in the periphery of the extension. The passage 234 also communicates with the annular chamber 220 by way of a port 240.

A piston 242 reciprocable in the chamber 204 has thereon a rearwardly extended sleeve 244 slidable on the extension 232, and the sleeve has therein a port 246 adapted to register with the beveled channel 238 for control of the passage 234. The piston 242 is of a type adapted to withstand high pressure without injury and to effectively seal in the complementary chamber so as to inhibit seepage of fluid past the piston.

As shown, the piston 242 has a head 248 provided with spaced passages 250 therethrough affording communications between the chambers 202 and 204. The head also has a concentric bore 252, and seated in this bore is a spring 254. A resilient washer 256 seated on the head has a marginal lip 258 and a concentric opening 260 registering with the bore 252 in the head of the piston. This washer is preferably made of rubber, having a high durometer reading, and the diameter of the washer is slightly less than the gauge of the complementary chamber, so that fluid may normally by-pass the washer.

A spacer or pressure block 262 seated on the washer has a face complementary to the face of the washer and a concentric extension 264 received by the opening 260 in the washer and the bore 252 in the head of the piston, and seated on the spring 254 so as to limit the compressibility of the washer to avoid binding thereof in the complementary chamber. The compression block has spaced passages 266 therethrough for the passage of fluid, and seated on the pressure block is a sealing cup 268 for control of the passages through the piston and the pressure block.

As in the preferred embodiment of the invention, high pressure imposed on the sealing cup 268 is transmitted by the pressure block 262 to the washer 256, resulting in radial expansion of the washer. Due to the corresponding abutting faces of the washer and the pressure block, the marginal flange or lip 258 of the washer is deformed under pressure and forced into engagement with the wall of the chamber over a substantial bearing surface, adequate to effectively seal the piston in the chamber. However, the expansion of the washer is limited to a degree determined by the elasticity of the spring 254.

The piston 242 is balanced between a spring 270, interposed between the sealing cup 228 on the head of the piston 210 and the back of the piston 242, and a spring 272 interposed between the sealing cup 268 on the head of the piston 242 and the head of the cylinder. These springs are preferably of high elasticity, and not only serve to normally balance the piston 242 in the chamber, but to retain the sealing cups 228 and 268 against displacement, and also to return the pistons 210 and 242 to their retracted positions.

This modification of the invention differs from the preferred embodiment only in that the valve structure and high pressure piston have been slightly changed.

The operation of both structures is identical, and, accordingly, further explanation is deemed unnecessary.

While this invention has been described in connection with certain specific embodiments, the principle involved is susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is:

1. A fluid pressure producing device comprising a cylinder having a large chamber and a small chamber, a piston reciprocable in the large chamber, a floating piston in the small chamber provided with a stem having a peripheral groove therein, and a valve for relief of pressure in the large chamber controlled by the peripheral groove in the stem of the floating piston.

2. A fluid pressure producing device comprising a cylinder having a large chamber and a relatively small chamber, a piston reciprocable in the large chamber, a free floating piston in the small chamber having a stem concentric to and slidable in the piston in the large chamber, and a valve connected between the pistons and controlled only by relative movement between the pistons, the floating piston being axially movable in both directions from its normal resting position.

3. A fluid pressure producing device comprising a cylinder having a large chamber and a relatively small chamber, a manually actuated piston in the large chamber having a passage therethrough communicating with the large chamber, and a free floating piston in the small chamber having a stem adapted to control the passage.

4. A fluid pressure producing device comprising a reservoir, a cylinder supplied therefrom having a large chamber and a relatively small chamber, a manually actuated piston in the large chamber having a passage therethrough providing a communication between the large chamber and the reservoir, and a floating piston in the small chamber provided with a concentric stem having a reduced portion movable in the passage for control thereof.

5. A fluid pressure producing device comprising a reservoir, a cylinder supplied therefrom having a large chamber and a relatively small chamber, a manually actuated piston in the large chamber having a passage therethrough providing a communication between the large chamber and the reservoir, and a floating piston in the small chamber having a stem interconnected with the manually actuated piston and providing in conjunction therewith a slide valve for relief of pressure in the large chamber opened only by pressure in the small chamber due to relative movement of the pistons.

6. A fluid pressure producing device comprising a reservoir, a cylinder supplied therefrom having a large chamber and a relatively small chamber, a piston in the large chamber, a free floating piston in the small chamber, means for actuating the pistons, and a spring-pressed valve for relief of pressure in the large chamber held closed by the spring assisted by the floating piston due to pressure acting rearwardly of the floating piston during initial actuation of the pistons and opened by the floating piston upon attaining a differential of pressures in the chambers, the floating piston being movable away from normally closed valve position during a normal operation.

7. A fluid pressure producing device comprising a reservoir, a cylinder supplied therefrom, spaced pistons reciprocable therein providing a pressure chamber therebetween, one piston having an opening through which fluid may flow from the pressure chamber into the reservoir and an inclined annular groove in the other piston for cooperation with the passage in the first-mentioned piston to gauge the flow of fluid through said opening, said means operative only upon relative movement of the pistons due to pressure imposed upon the second-mentioned piston.

8. A fluid pressure producing device comprising a reservoir, a cylinder supplied therefrom, a pair of spaced pistons reciprocable in the cylinder defining a pressure chamber therebetween, said pistons slidably coupled together to move as a unit and for resistable relative movement, and valve means responsive to a predetermined relative shiftable movement of the pistons to exhaust fluid from the pressure chamber, said valve means comprising a stem on one piston having an axially graduated passage operative to cooperate with a passage in the other piston to provide for the flow of fluid therebetween.

9. A fluid pressure producing device comprising a reservoir, a cylinder communicating therewith, spaced pistons reciprocable therein defining a low pressure chamber between the pistons and a high pressure chamber forward of the pistons, one piston adapted to by-pass fluid under pressure from the low pressure chamber into the high pressure chamber, the other piston adapted to by-pass fluid from the reservoir into the low pressure chamber, said last named piston having an opening therethrough for flow of fluid from the low pressure chamber into the reservoir, and a reduced portion on the other piston for gauging the flow of fluid through said opening, operative only upon relative movement of the pistons.

10. A fluid pressure producing device comprising a reservoir, a cylinder having a low pressure chamber and a high pressure chamber, a piston reciprocable in each of the chambers, the piston in the low pressure chamber having a circumferential chamber communicating by way of a fluid passageway with the low pressure chamber, the piston in the high pressure chamber having a slide valve element telescoped within the piston in the low pressure chamber for cooperation with the passageway to provide for the passage of fluid therethrough, and yieldable means spacing said pistons apart urging said valve element to close said passageway against fluid flow therethrough, said valve operative only upon relative movement of the pistons.

11. A fluid pressure producing device comprising a cylinder having a large chamber and a small chamber, a piston reciprocable in the large chamber having a concentrically extended sleeve, and a piston reciprocable in the small chamber having a sleeve telescoping the sleeve of the other piston and providing in conjunction therewith a slide valve, said slide valve adapted to relieve pressure in the large chamber controlled solely by the relative movement of the piston due to the pressure in the small chamber.

12. A fluid pressure producing device comprising a cylinder having a large chamber and a relatively small chamber, a piston reciprocable in the large chamber having a passage therein, and a piston in the small chamber relatively movable to the first piston provided with a stem having a reduced conical section, the conical section cooperating with the passage in the first-mentioned piston to provide for relief of pressure in the large chamber.

13. A fluid pressure producing device comprising a cylinder having a large chamber and a relatively small chamber, a piston in the large chamber provided with a concentric bore and having a passage communicating with the bore, and a floating piston in the small chamber relatively movable to the first piston having an extension supported in the bore of the first-mentioned piston, the extension having an annular curved groove whereby upon retraction of the floating piston the groove cooperates with the passage to provide for regulated communication between the large chamber and passage.

OWEN H. FOWLER.